INVENTOR.
HERBERT G. WHITING
BY
Reynolds, Beach & Christine
ATTORNEYS

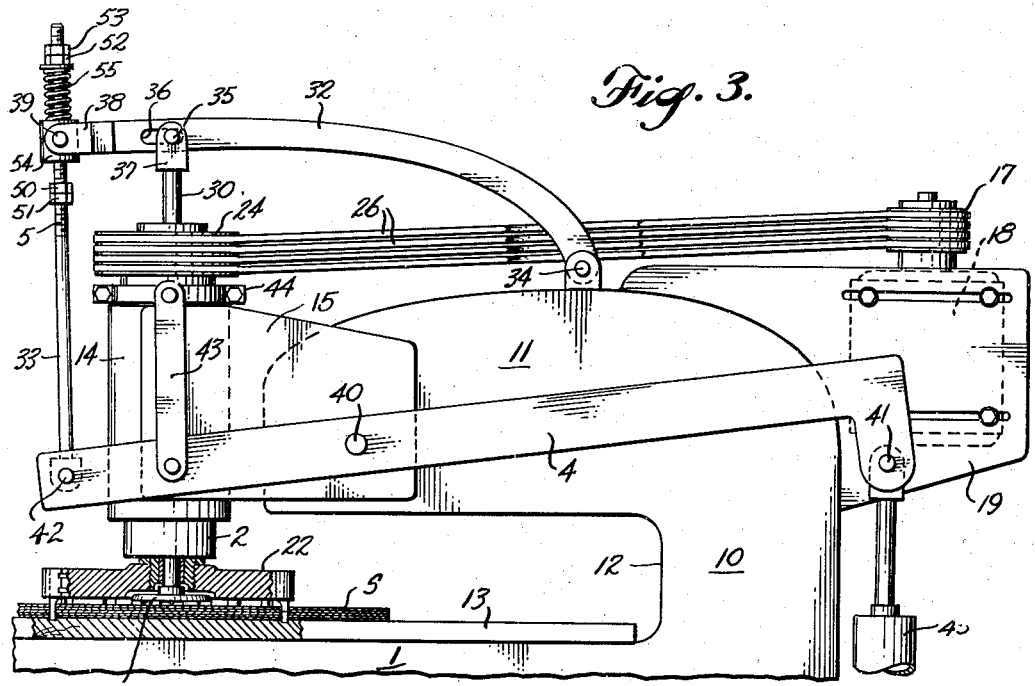

United States Patent Office 2,899,991
Patented Aug. 18, 1959

2,899,991

CIRCLE CUTTING MACHINE FOR WOODY SHEET MATERIAL

Herbert G. Whiting, Oswego, Oreg., assignor to Cascades Plywood Corporation, Portland, Oreg., a corporation of Delaware Application July 8, 1957, Serial No. 670,432

8 Claims. (Cl. 144—136)

This invention relates to a circle cutting machine and in particular a machine for cutting annular grooves or slots in heavy sheet material such as plywood and hardboard.

A principal object of the present invention is to provide a machine for cutting annular grooves and particularly annular slots in a panel quickly and largely automatically. The automatic feature of the machine resides principally in the provision of mechanism to hold a work sheet firmly during the cutting operation without requiring manipulation separate from the feeding of cutters to the work.

A further important object is to provide a cutter head having cutting bits which can be adjusted readily to enable grooves or slots of different diameters to be cut and which is constructed so that adjustment of the cutter bits for different diameters can be effected quickly and easily yet the cutting bits will be held in the adjusted position securely.

A more specific object is to coordinate the movement of a hold-down and a cutter head so that the hold-down will grip the work prior to engagement of the cutter head with it and the hold-down will be maintained pressed against the work until the cutting operation is completed. Further the hold-down will continue to be held firmly in engagement with the work until after the cutter head has been withdrawn from the work.

It is also an object to construct such a circle cutting machine ruggedly so that it will operate satisfactorily for heavy duty work over extended periods with minimum upkeep.

Another object is to make provision for adjusting the machine easily and quickly to operate on work sheets of different thicknesses to insure that ample clearance will be provided to receive a sheet beneath the hold-down and cutter head while at the same time coordinating the movement of the hold-down and cutter head so that the hold-down will engage the work sheet prior to contact of cutters with such sheet irrespective of the sheet thickness.

These various objects can be accomplished by a machine in which the cutter head is a thick plate having deep radially extending notches opening at its periphery in which cutter bits are secured. The cutter bits are adjustable along such notches to cut annular grooves or slots of different diameter. The cutter head is supported by an upright hollow shaft through which extends concentrically a rod supporting a hold-down on its lower end which is also disposed concentrically of the cutter head. The cutter head shaft and hold-down rod are guided for conjoint and relative lengthwise raising and lowering movement and are interconnected by lever mechanism which effects downward movement of the hold-down into engagement with a work sheet before the cutting bits contact the work sheet, and the hold-down continues to grip the work sheet until after the cutter head has completed its downward cutting movement and its upward retracting movement to clear the worksheet.

Figure 1 is a side elevation of the circle cutting machine with parts broken away and showing the hold-down and cutter head in retracted positions. Figure 2 is a similar view showing the hold-down lowered into holding position with the cutter head still clear of the work sheet. Figure 3 is a further similar view showing the cutter head lowered to the position completing the cutting operation.

Figure 4 is an enlarged vertical section through the central portion of the cutter head and its supporting and driving structure, the remainder of the machine being broken away.

Figure 5 is a top perspective view of the cutter head with the near quadrant broken away.

Figure 6 is a top perspective view of a cutter bit and the adjacent portion of its mounting structure and Figure 7 is a similar view of the opposite side of the cutter bit.

Figure 1:
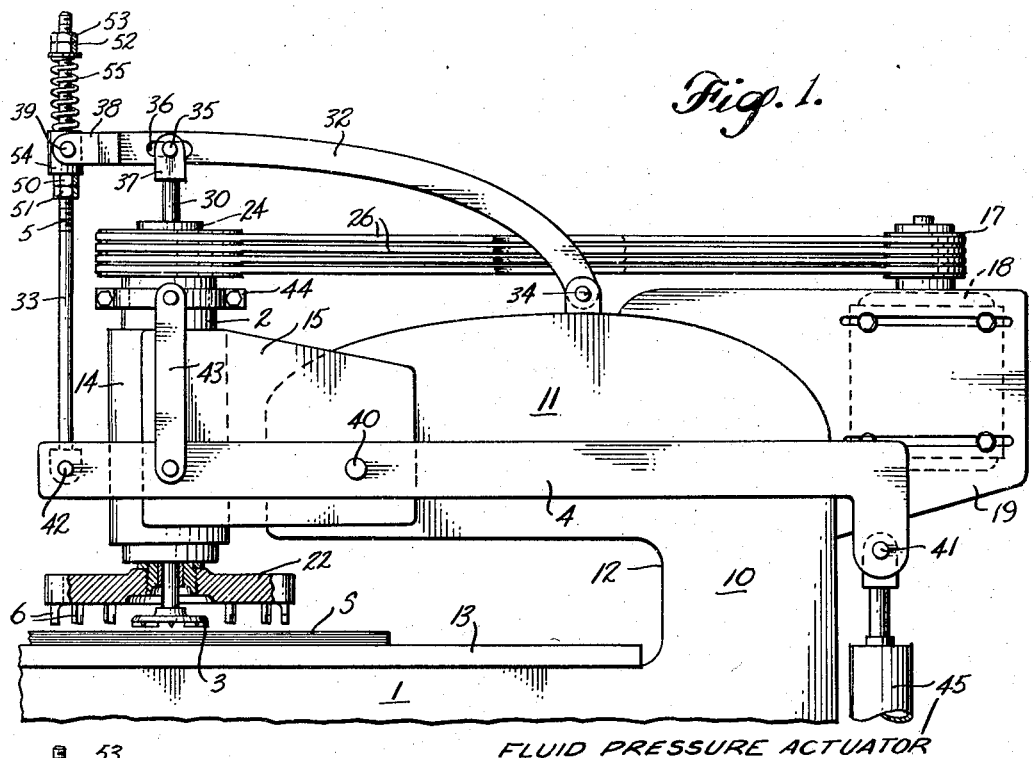

The stationary or mounting structure of the machine includes principally a C-frame including a base 1, a post 10 projecting upward from one side of the base and a head 11 overhanging the base 1 but leaving a deep throat 12 into which a work piece can be inserted. On the base 1 is supported the work table 13 on which a work sheet S can be laid in which a circular groove or slot is to be cut. The stationary guide sleeve 14 is located directly above the portion of the work to be operated upon and is supported from or mounted upon the C-frame head 11 by supporting side plates 15 or equivalent structure.

Within the stationary guide sleeve 15 is slidably received the upright cutter head shaft mounting sleeve 2 which is guided for vertical movement in the stationary sleeve 14 by suitable vertically spaced slide bearings 16 as shown best in Figure 4. Within the sleeve 2 is rotatably mounted, concentric with such sleeve, the hollow cutter head shaft 20 by upper and lower antifriction bearings 21 of the radial and thrust type. Such bearings mount the cutter head shaft for rotation relative to the sleeve but prevent relative lengthwise movement of the shaft 20 and sleeve 2 so that they will move up and down as a unit within the mounting sleeve 14.

On the lower end of the hollow cutter head shaft 20 the cutter head 22 is mounted, preferably by a thread 23 which is of the type of spiral tending to be tightened by rotation of the cutter head shaft in the direction to drive the cutters of the cutter head for cutting the work. Such rotation of the cutter head is effected by the driven pulley 24 secured to the upper end of the cutter head shaft by a key 25. This pulley may be driven by V-belts 26 connected to the drive pulley 17 which is turned by the motor 18 mounted on the motor mounting plate 19 which is attached to the C-frame at a location spaced from the guide sleeve 14.

The hold-down for the work is located concentrically of the cutter head 22 and includes the hold-down head or plate 3 which is mounted on the lower end of the supporting rod 30 extending concentrically upward through the hollow cutter head shaft 20. This hold-down rod is nonrotative and the cutter head shaft is rotatively isolated from the hold-down rod by the plain bearings 27 at the upper and lower ends of the cutter head shaft. A recess 28 is provided in the lower surface of the cutter head to receive the hold-down head 3 when the hold-down head and the cutter head are in their positions of closest axial approach. To increase its effectiveness ribs 31 are provided on the lower work contacting surface of the hold-down plate, extending in radial directions for a substantial distance. The width of such ribs is not critical but they should not be so sharp as to dent the work.

The actuating mechanism for moving the cutter head 22 up and down relative to work on the work table 13 is composed principally of the lever 4 which swings about the fixed pivot 40 secured to the frame of the machine, such as to one of the side plates 15. Preferably this lever includes duplicate lever bars located one at each side of the machine frame and interconnected at opposite ends by rods 41 and 42. The portion of lever 4 at one side of the pivot 40 is connected to the upright slidable cutter head shaft mounting sleeve 2 by links 43 having their lower ends pivotally connected to the bars of lever 4 and their upper ends pivotally connected to opposite sides of the yoke 44.

As has been discussed above, the mounting sleeve 2 is slidable vertically in the stationary sleeve 14 and is rotatively separated from the hollow cutter head axle 20 by the antifriction bearings 21. Both to hold this mounting sleeve 2 against rotation and to slide it positively lengthwise, the yoke 44 is clamped securely to such mounting sleeve above the stationary sleeve 14 as shown best in Figure 4. Sleeve 2 therefore cannot turn, but can be moved upward and downward positively by upward and downward movement of the yoke 44 when the lever 4 is swung. Such swinging movement of the lever can be effected by the fluid pressure actuator 45 connected to the rod 41 which actuator preferably is of the hydraulic piston and cylinder type.

It is important that the vertical movements of the hold-down and the cutter head be coordinated so that the hold-down will engage the work sheet to hold it firmly against the table 13 before the cutting bits contact the work and that following completion of the cutting operation the bits be withdrawn from the work before the hold-down is released. Coordination of the vertical movements of the hold-down and cutter head can be effected by utilizing swinging of the lever 4 to shift vertically both the cutter head shaft 20 and the hold-down rod 30. For this purpose such hold-down rod can be connected to the lever 4 by a guide lever 32 and a connecting rod 33. One end of this connecting rod may be pivotally secured to the cross rod 43 connecting corresponding ends of the levers 4 at opposite sides of the machine frame.

One end of the guide lever 32 is pivotally connected to the machine frame by a stationary pivot 34. The hold-down rod 30 and the lever 32 are connected by a pin 35 extending through a slot 36 in the lever and received in the opposite side portions of a yoke 37 mounted on the upper end of the hold-down rod 30. The swinging end of the guide lever 32 and the connecting rod 33 are interconnected by adjustable lost motion structure.

Such lost motion structure includes threads 5 on the rod 33 on which a lower adjusting nut 50 and lock nut 51 and upper adjusting nut 52 and lock nut 53 are threaded. Encircling the connecting rod 33 between these sets of adjusting and lock nuts is a slidable sleeve 54 and a compression spring 55. The sleeve 54 is pivotally secured to a yoke 38 on the end of guide lever 32 by a pivot pin 39. As long as the spring 55 holds the sleeve 54 in engagement with the nut 50 as shown in Figures 1 and 2, the connections 42 and 39 of the rod to levers 4 and 32 will move the same distance vertically as the levers are swung.

Figure 2:
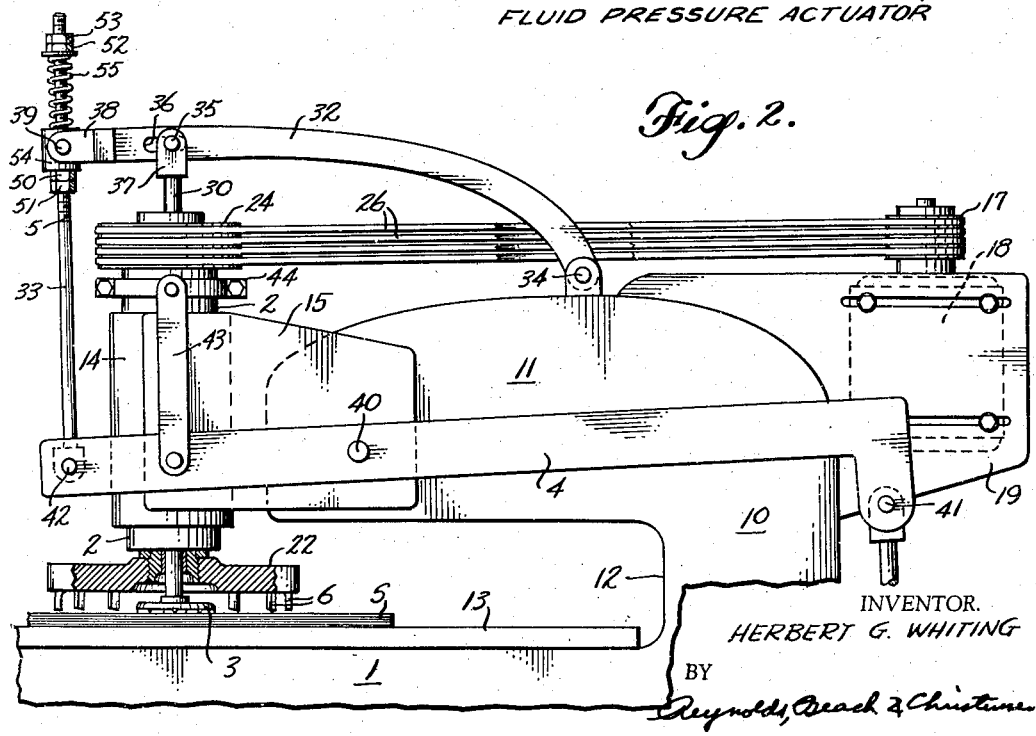

It is desirable, however, for the hold-down to be moved downward more rapidly than the cutter head during initial downward movement of these parts from the positions shown in Figure 1 to those of Figure 2. Consequently, it is preferred that the mounting pivot 34 of the guide lever 32 be located farther from the hold-down rod connection 35 than the distance between the pivots 40 of the levers 4 and the connections of links 43 to the levers. The connections of links 43 to the levers 4 and to the yoke 44 will be approximately in the same plane as the connection 35 of hold-down rod 30 to lever 32 so that these connections will be spaced approximately the same distance from the connections of connecting rod 33 to the two levers. The ratio of movement of the hold-down and the cutter head will depend upon the distances between the lever pivots and the connections to them mentioned and the greater the difference in the distances between pivots 34 and 35 and pivot 40 and links 43 the greater will be the difference in relative vertical movement of the hold-down and the cutter head.

The cutter head 22 carries cutting bits 6 which are removable, replaceable and adjustable in the cutter head to cut annular grooves or slots of different diameters. Each of these cutting bits is relatively thin radially and relatively thick circumferentially projecting downward in cantilever fashion from the cutter head. The leading lower corner of each cutting bit may have a Carboloy tip 60. The root ends of these bits are received respectively in deep radially extending notches in the cutter head plate 22 which open at the periphery of such plate. In order to hold such cutter bits against vertical movement as the bits are pressed against the work, one face of each of the notches has horizontal ribs and grooves or is serrated, which surface is designated 29. The root of each cutter bit has on one side corresponding serrations or a surface complemental to the ribbed and grooved surface as indicated at 61 so that when these surfaces are pressed together the cutter bit cannot be displaced vertically.

Because the ribs and grooves or serrations of both the cutter head grooves and the root portions of the cutting bits extend horizontally it will be evident that the bits can be adjusted toward and away from the center of the cutter head disk 22. Such adjustment can be over a considerable distance. By such adjustment circles up to a diameter of thirty inches may be cut and if necessary by interchanging the cutter disk 22 and perhaps using cutting bits of special shape, circles as small as two inches in diameter may be cut. To hold the bits in the desired adjusted positions in the grooves the sides of the grooves opposite the serrations 29 may have in them a pair of horizontal grooves 29' shown best in Figure 7. A gib 62 may then be provided to embrace the root portion of each cutting bit and into such gib may be screwed locking screws 63, the outer ends of which are received in the grooves 29' of the cutter head notches. The screws 63 may be rotated to bear in these grooves and thus press the gib tightly against the root portion of the cutting bit which in turn will press the root portion of such bit firmly into engagement with the serrations 29.

While normally only a single circle groove or slot will be cut by the cutters 6 so that such cutters will all be located at the same distance from the center of the circle, it will be possible to cut more than one groove or slot by placing some cutters at one spacing from the center of rotation of the cutter head and other cutters at a different spacing. Whatever the adjustment of the cutting bits may be radially of the cutter head it is important that the cutting point 60 be located precisely on a radius of the cutter head. Also, where the circle to be cut is of small diameter it may be desirable to use a smaller number of cutting bits in which event such bits can be provided only in alternate notches of the cutter head, for example, or even in every third notch of the cutter head. Smaller cutter heads can have fewer notches, if desired.

In operation any suitable control may be provided to energize the lever actuator 45. As this actuator is extended to raise the end of lever 4 to which it is connected from the position shown in Figure 1, the left end of the lever will be moved downward about the fulcrum 40. As this lever end tilts downward the connecting rod 33 also will draw downward the left end of guide lever 32 to move downward conjointly the hold-down rod 30. Because the portion of lever 32 between pivot 34 and the connection 35 with the hold-down rod is longer than the distance between pivot 40 of lever 4 and link 43, the hold-down rod 30 will be moved downward faster than the cutter head is moved downward by yoke 44 being moved by links 43. Consequently, the hold-down 3 will engage the work sheet S before the cutting bits of the cutter head engage it, as shown in Figure 2. As tilting of the lever continues the bearing of the hold-down on the work sheet will maintain it stationary both against lateral movement and rotation.

Continued tilting of the lever 4 will move the cutter head 22 farther downward but the engagement of the hold-down 3 with the work sheet will prevent the hold-down rod 30 from continuing to move downward. At this time the lost motion connection composed of the threaded portion 5 of connecting rod 33, the backing nuts 52 and 53, the spring 55 and the sleeve 54 connected to the swinging end of lever 32 will come into operation. Downward movement of the left end of lever 4 will continue to draw connecting rod 33 downward but, because sleeve 54 connected to lever 32 cannot move downward any farther, the spring 55 will simply be compressed between the sleeve 54 and the nut 52. As the left end of lever 4 is thus moved downward the links 43 will of course continue to pull yoke 44 downward, consequently lowering the cutter head. Such cutter head being rotated by the motor 18 and belts 26 will cause the cutting bits to cut a groove or a slot of circular shape in the work sheet S.

The length of stroke of the actuator 45 may be varied so that the cutter head will descend only far enough to cut a groove in the work sheet or far enough to cut a slot clear through the work sheet as may be desired. If the slot is cut entirely through the sheet a circular disk will be cut out. If the cutting bits are spaced different distances from the center of rotation of the cutter head, one or more circular rings will be cut from the work sheet. If it is desired to cut a thinner work sheet the nuts 50 and 51 may be screwed down on the thread 5 of the connecting rod 33 so as to lower the hold-down 3 in its uppermost position. When the lever 4 is tilted, therefore, such adjustment will insure that the hold-down will engage the work sheet prior to contact of the cutting bits with it. The recess 28 insures that even where the cutting head must be lowered sufficiently so that the lower surface of the head approaches close to the upper surface of the work sheet at the completion of the cutting operation, the rotating cutter head will not engage the nonrotative hold-down. Rotation of the hold-down is of course prevented by the connection of yoke 37 to the lever 32.

I claim as my invention:

1. Rotary cutting mechanism comprising a rotatable annular cutter head, a tubular upright shaft carrying said cutter head on its lower end, means guiding said shaft for upward and downward movement, a hold-down beneath and disposed concentrically of said cutter head, an upright rod carrying said hold-down on its lower end and extending upwardly through said tubular shaft, means guiding said rod for upward and downward movement relative to said shaft, and differential drive means including a relatively slow moving member connected to said shaft and a relatively fast moving member connected to said rod, said two members being interconnected for simultaneous movement to effect downward movement of said rod faster than downward movement of said shaft.

2. The rotary cutting mechanism defined in claim 1, including a frame, in which differentiating drive means includes levers pivoted to said frame and respectively pivoted to the shaft and the rod, and means interconnecting said levers and effecting conjoint swinging thereof, the length of said lever pivoted to the rod between its rod pivot and its frame pivot being greater than the length of the lever pivoted to the shaft between its shaft pivot and its frame pivot.

3. Rotary cutting mechanism comprising a rotatable annular cutter head, a tubular upright shaft carrying said cutter head on its lower end, a frame, means guiding said shaft for upward and downward movement relative to said frame, a first lever pivotally connected to said shaft and to said frame, a hold-down beneath and disposed concentrically of said cutter head, an upright rod carrying said hold-down on its lower end and extending upwardly through said tubular shaft, means guiding said rod for upward and downward movement relative to said shaft, a second lever pivotally connected to said rod above said shaft and to said frame, linkage interconnecting said levers for conjoint movement, and means connected to one of said levers and effecting swinging of said levers relative to said frame for moving said shaft and said rod up and down conjointly.

4. The rotary cutting mechanism defined in claim 3, in which the length of the second lever between its rod pivot and its frame pivot is greater than the length of the first lever between its shaft pivot and its frame pivot, and the linkage means interconnects portions of the levers farther from the frame than the lever to shaft pivot and the lever to rod pivot and substantially equal distances from the lever to shaft pivot and the lever to rod pivot for effecting downward movement of the rod and hold-down faster than the downward movement of the shaft and cutter head as the linkage means moves downward.

5. The rotary cutting mechanism defined in claim 3, in which the linkage means includes a link variable in effective length enabling continued downward movement of the shaft, the cutter head and the swinging portion of the first lever after downward movement of the rod, the hold-down and the second lever have been arrested by engagement of the hold-down with the work.

6. The rotary cutting mechanism defined in claim 3, in which the second lever is pivotally connected directly to the upper portion of the rod and holds the rod and hold-down against rotation relative to the frame.

7. Rotary cutting mechanism comprising a rotatable annular cutter head, a tubular upright shaft carrying said cutter head on its lower end, means guiding said shaft for upward and downward movement, a hold-down beneath and disposed concentrically of said cutter head, an upright rod carrying said hold-down on its lower end and extending upwardly through said tubular shaft, means guiding said rod for upward and downward movement relative to said shaft, and differential drive means including a relatively slow moving member connected to said shaft and a relatively fast moving member connected to said rod, said two members being interconnected for simultaneous movement to effect downward movement of said rod faster than downward movement of said shaft, and including lost motion means enabling continued downward movement of said shaft with said cutter head relative to said rod and hold-down following engagement of said hold-down with the work.

8. Rotary cutting mechanism comprising a rotatable annular cutter head, a tubular upright shaft carrying said cutter head on its lower end, means guiding said shaft for upward and downward movement, a hold-down beneath and disposed concentrically of said cutter head, an upright rod carrying said hold-down on its lower end and extending upwardly through said tubular shaft, means guiding said rod for upward and downward movement relative to said shaft, and actuating means interconnecting said shaft and said rod and effecting conjoint downward movement thereof, and including lost motion linkage means enabling continued downward movement of said shaft with said cutter head relative to said rod and hold-down following engagement of said hold-down with the work and variable in effective length for altering the relative relationship of said cutter head and hold-down prior to engagement thereof with the work.

(References on following page)

References Cited in the file of this patent

UNITED STATES PATENTS

| | | | |
|---|---|---|---|
| 100,927 | Ritchel | Mar. 15, 1870 |
| 222,970 | Wenchel | Dec. 23, 1879 |
| 260,265 | Wenchel | June 27, 1882 |
| 379,602 | Philbrick | Mar. 20, 1888 |
| 855,901 | McMaster | June 4, 1907 |
| 919,914 | Miller | Apr. 27, 1909 |
| 1,685,366 | Leash | Sept. 25, 1928 |
| 1,862,406 | Kefflo | June 7, 1932 |
| 2,468,562 | Lank | Apr. 26, 1949 |

UNITED STATES PATENT OFFICE
CERTIFICATE OF CORRECTION

Patent No. 2,899,991            August 18, 1959

Herbert G. Whiting

It is hereby certified that error appears in the printed specifiation of the above numbered patent requiring correction and that the said Letters Patent should read as corrected below.

Column 5, line 67, for "differentiating" read -- the differentia --.

Signed and sealed this 16th day of February 1960.

(SEAL)
Attest:
KARL H. AXLINE

Attesting Officer

ROBERT C. WATSON
Commissioner of Patents